US008209875B1

(12) United States Patent
Harris

(10) Patent No.: US 8,209,875 B1
(45) Date of Patent: Jul. 3, 2012

(54) PRECISION SHAFT ALIGNMENT SYSTEM

(76) Inventor: Danny Harris, Ashland, KY (US)

(*) Notice: Subject to any disclaimer, the term of this patent is extended or adjusted under 35 U.S.C. 154(b) by 349 days.

(21) Appl. No.: 12/575,881

(22) Filed: Oct. 8, 2009

(51) Int. Cl.
*G01B 7/30* (2006.01)
*G01B 5/24* (2006.01)
(52) U.S. Cl. ............... 33/412; 33/286; 33/645; 700/279
(58) Field of Classification Search .............. 33/286, 33/412, 529, 613, 645; 700/279
See application file for complete search history.

(56) References Cited

U.S. PATENT DOCUMENTS

| | | | |
|---|---|---|---|
| 2,815,582 A | 12/1957 | Karstens | |
| 3,441,326 A * | 4/1969 | Swensson | 384/251 |
| 5,526,282 A * | 6/1996 | Nower et al. | 700/279 |
| 5,896,672 A * | 4/1999 | Harris | 33/645 |
| 5,920,999 A | 7/1999 | Hutter | |
| 5,980,094 A | 11/1999 | Nower | |
| 6,223,102 B1 * | 4/2001 | Busch | 700/279 |
| 6,411,375 B1 * | 6/2002 | Hinkle et al. | 356/152.1 |
| 6,784,986 B2 | 8/2004 | Lysen et al. | |
| 7,174,649 B1 | 2/2007 | Harris | |
| 7,224,264 B2 * | 5/2007 | Honan, III | 340/431 |
| 7,484,312 B2 * | 2/2009 | Morgan | 33/645 |
| 7,905,465 B1 * | 3/2011 | Anwar | 248/673 |
| 2002/0133960 A1 | 9/2002 | Cross | |
| 2006/0196060 A1 | 9/2006 | Suing et al. | |
| 2008/0201097 A1 * | 8/2008 | Stromberg et al. | 702/94 |

* cited by examiner

*Primary Examiner* — R. A. Smith
(74) *Attorney, Agent, or Firm* — Michael I. Kroll

(57) ABSTRACT

A precision shaft alignment system for establishing concentric alignment of a first rotatably mounted shaft and a second opposed, rotatably mounted shaft that can be configured for stand-alone or retrofitted with an existing measuring system.

2 Claims, 15 Drawing Sheets

PRECISION SHAFT ALIGNMENT SYSTEM

BACKGROUND OF THE INVENTION

Field of the Invention

The present invention relates generally to alignment systems and, more specifically, to a precision shaft alignment system for establishing concentric alignment of a first rotatably mounted shaft and a second opposed, rotatably mounted shaft.

There is a known need in the art to properly align the shaft of a first torque producing unit with the shaft of a second loading (component) unit. The desired axial alignment, if true and precise, provides for the high efficiency coupling of torque from the first unit to the second unit. Often the shafts are associated with respective rotating members of the each unit. The misalignment of the shafts may provide an x,y angular alignment error where the center-lines of the two shafts intersect at an angle, or may be manifested by a x,y parallel offset misalignment error where the respective shafts are parallel but exhibit an axial offset with the center-lines of each shaft not concentrically or coaxially aligned. Of course, a combination of angular and parallel offset misalignments are certainly possible. If the units are not properly aligned, where the respective shafts are not axially aligned along a common center-line or axis, the result may be damage to various components including items such as bearings, seals, gears, couplings, and ultimately machine failure. In addition, energy lost via friction and "vibration" may be conserved with proper axial alignment and delivered to the load.

The precision shaft alignment system of the present invention meets these needs and provides means to ensure concentrically or coaxially aligned shafts.

The precision shaft alignment system of the present invention may be utilized as a stand alone system, or may be retrofitted with an existing measuring system. Both methods provide the user with a high precision and efficient means to align a motor drive shaft with the shaft of a motor driven machine or the like.

The precision shaft alignment system of the present invention features a portable, removable user friendly automated approach to the alignment process. The system provides means for a much higher degree of positioning accuracy and results in reducing the amount of time required to achieve the alignment from hours to just minutes.

When utilized as a stand alone system, the precision shaft alignment system of the present invention includes a user input device such as a touch screen monitor, key entry, or other, a computing, control and display module that calculates and initiates control of the required positional travel, precision measuring devices that read and send the coordinates for the centerline of axis for each of the shafts and actuators that provide means for the unit to be repositioned. Based on the calculated position and directly responding to the positional change communication via 2-way RS 232 from measuring devices (C & D) placed at the front and rear mounting means.

A plurality of precision measuring modules are utilized to identify the X-Y coordinates of both units. The fixed unit is equipped with a digital measuring device or laser source with a single or dual axis laser measuring sensor on the drive shaft. The movable unit to be positioned is equipped with a digital measuring device or a laser source with a single or dual axis laser measuring sensors on the drive shaft. The mounting feet have two laser sources with three single or dual axis laser measuring sensors, or three digital measuring devices. Additionally, a plurality of actuators either independently powered and/or manually powered hydraulic jacking tool and/or conventional jack bolts, pry bars, etc are utilized to drive the unit to be positioned. Each of the mounting feet are equipped with elevation positioning actuators, as well as transverse positioning actuators providing means for horizontal positioning.

The precision measuring modules measure the X-Y coordinates along two points on the centerline of both drive shafts. These coordinates are signaled to, or data entered into the computing and control module. The computing and control module calculates the relationship of the measuring modules C & D (front and rear mounting means) in coordinance with the concentric line of axis of measuring devices A & B (fixed & movable shafts). To determine the necessary X-Y travel of the second unit to provide concentric shaft alignment.

Since the actuators are independently movable, parallel offset misalignment, angular misalignment, as well as a combination of angular and parallel offset misalignments can be corrected. Based on position and positional change communicated via two way RS 232 from and to measuring modules C & D placed at the front and rear mounting means.

When utilized as a retrofit system, the precision shaft alignment system of the present invention includes a user input device such as a touch screen monitor, key entry, or other providing means to enter shaft coordinates from the existing measuring system, a computing, control and display module that calculates and initiates and controls the required positional travel, and independently movable actuators that provide means for the unit to be repositioned. Based on information provided by (X & Y) C & D precision measuring modules that communicate 2-way position and positional changes with a reference to the concentric line of axis as the motor is being controlled into position.

Additionally, the precision shaft alignment system of the present invention provides means for a user defined and/or a continuous self monitoring for establishing and maintaining concentric alignment of a first rotatably mounted shaft and a second opposed, rotatably mounted shaft including thermal growth and machine vibration by utilizing the two dual axis laser measuring devices and targets.

SUMMARY OF THE PRESENT INVENTION

A primary object of the present invention is to provide a precision shaft alignment system for establishing concentric alignment of a first rotatably mounted shaft and a second opposed, rotatably mounted shaft.

Another object of the present invention is to provide a stand alone or retrofit precision shaft alignment system with user input device such as a touch screen monitor, key entry, or other.

Yet another object of the present invention is to provide a stand alone or retrofit precision shaft alignment system with a computing, control and display module that calculates and initiates and controls the required positional travel for establishing concentric alignment of a first rotatably mounted shaft and a second opposed, rotatably mounted shaft.

Still yet another object of the present invention is to provide a stand alone precision shaft alignment system with precision measuring devices that read and send the coordinates for the centerline of axis for each of the shafts.

Another object of the present invention is to provide a stand alone precision shaft alignment system with actuators that provide means for the unit to be repositioned and directly responds to the control computing and display module with a constant reference to the concentric line of axis as the motor is being controlled into position based upon 2-way via RS 232 position and positional change information being communicated by the front and rear (X & Y) measuring modules.

Yet another object of the present invention is to provide a stand alone precision shaft alignment system with manually powered hydraulic jacking tool and/or conventional tools such as jack bolts, pry bars etc. with the movement controlled by monitoring a series of changing colored lights: Green, Yellow, Red.

Flashing Green Arrow Light—Identifies direction of movement travel.

Green Light—Identifies if the front or rear or both front and rear requires movement.

Yellow Light—Signals when you are within close positioning proximity.

Flashing Yellow Light—Signals when you are about to exceed parallel offset proximity in the horizontal parallel offset process to maintain equal movement of the front and rear.

Red Light—Signals when to stop movement.

These lights are displayed on and responsive to the control computing and display module with a constant reference to the concentric line of axis as the motor is being controlled into position based upon 2-way RS 232 position and positional change information being communicated by the front and rear (X&Y) measuring modules by manually stopping when the angular and parallel offsets are corrected. In the vertical angular process of the manual movement the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

Still yet another object of the present invention is to provide a stand alone or retrofit precision shaft alignment system with independently powered actuators to correct offset misalignment, angular misalignment, as well as a combination of angular and parallel offset misalignments between shafts that directly responds to the control computing and display module with a constant reference to the concentric line of axis as the motor is being controlled into position based upon 2-way via RS 232 position and positional change information being communicated by the front and rear (X & Y) measuring modules.

Another object of the present invention is to provide a stand alone or retrofit precision shaft alignment system with manually operable hydraulic jack and/or conventional tools such as jack bolts, pry bar, etc. to correct offset misalignment, angular misalignment, as well as a combination of angular and parallel offset misalignments between shafts with the movement controlled by monitoring a series of changing colored lights: Green, Yellow, Red.

Flashing Green Arrow Light—Identifies direction of movement travel.

Green Light—Identifies if the front or rear or both front and rear requires movement.

Yellow Light—Signals when you are within close positioning proximity.

Flashing Yellow Light—Signals when you are about to exceed parallel offset proximity in the horizontal parallel offset process in order to maintain equal movement of the front and rear.

Red Light—Signals when to stop movement.

These lights are displayed on and responsive to the control computing and display module with a constant reference to the concentric line of axis as the motor is being controlled into position based upon 2-way RS 232 position and positional change information being communicated by the front and rear (X&Y) measuring modules by manually stopping when the angular and parallel offsets are corrected. In the vertical angular process of the manual movement the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

Yet another object of the present invention is provide a retrofit precision shaft alignment system that utilizes an existing measuring system to define the required travel to achieve concentric alignment of a first rotatably mounted shaft and a second opposed, rotatably mounted shaft that directly responds to the control, computing and display module with a constant reference to the concentric line of axis as the motor is being controlled into position based upon 2-way via RS 232 position and positional change information being communicated by the front and rear (X & Y) measuring modules.

Still yet another object of the present invention is to provide a user defined or self monitoring precision shaft alignment system for establishing and maintaining concentric alignment of a first rotatably mounted shaft and a second opposed, rotatably mounted shaft including thermal growth, soft foot and machine vibration by utilizing a plurality of laser sources with dual axis measuring sensors.

Additional objects of the present invention will appear as the description proceeds.

The present invention overcomes the shortcomings of the prior art by providing a precision shaft alignment system for establishing concentric alignment of a first rotatably mounted shaft and a second opposed, rotatably mounted shaft that can be configured for stand alone or retrofitted with an existing measuring system.

The present invention also overcomes the shortcomings of the prior art by providing a stand alone or retrofit precision shaft alignment system with a manually powered hydraulic jacking system and/or conventional tools such as jack bolts, pry bars, etc. and/or independently powered actuators to correct offset misalignment, angular misalignment, as well as a combination of angular and parallel offset misalignments between shafts.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
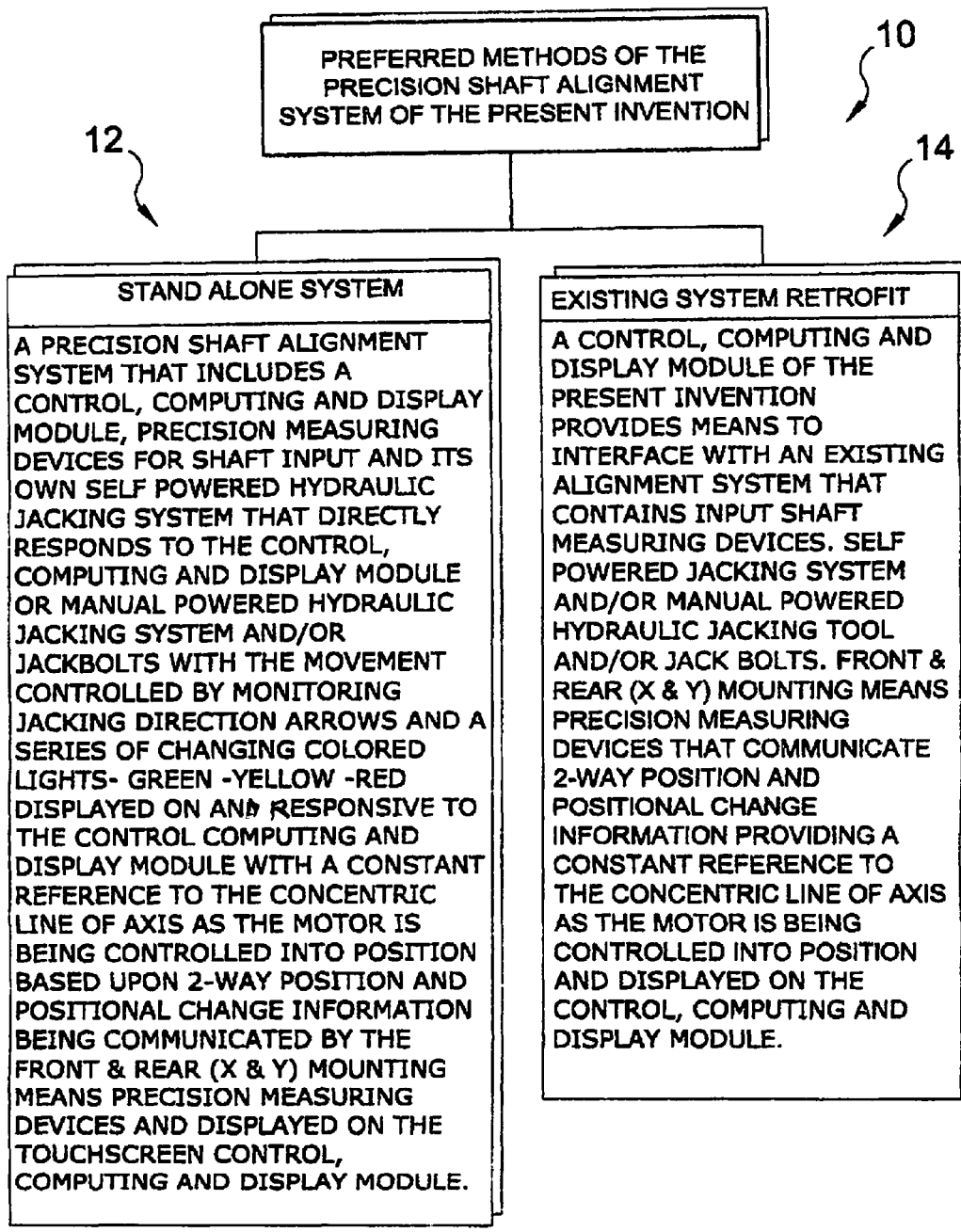
FIG. 1 is a block diagram of the precision shaft alignment system of the present invention's preferred methods.

Turning now descriptively to the drawings, in which similar reference characters denote similar elements throughout the several views, the figures illustrate the Precision Shaft Alignment Apparatus of the present invention of the present invention. With regard to the reference numerals used, the following numbering is used throughout the various drawing figures.

10 Precision Shaft Alignment Apparatus of the present invention
12 stand-alone system of 10
14 existing system retrofit of 10
16 user input device
18 computing and control module
20 shaft input precision measuring device by others
22 actuators
24 mounting means precision measuring device
26 digital measuring device
28 single axis laser measuring sensor
30 dual axis laser measuring sensor
32 shaft-mounted measuring device on fixed unit shaft
34 shaft-mounted measuring device on variable position unit shaft
36 fixed unit
38 variable position unit
40 elevation actuators
42 first post of 40
44 transverse positioning actuator
46 shaft of 36
48 shaft of 38

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a block diagram of the precision shaft alignment system of the present invention's 10 preferred methods. The precision shaft alignment system of the present invention 10 may be utilized as a stand-alone system 12, or may be retrofitted with an existing measuring system 14. Both methods provide the user with a high precision and efficient means to align a motor drive shaft with the shaft of a motor driven machine or the like.

Figure 2:
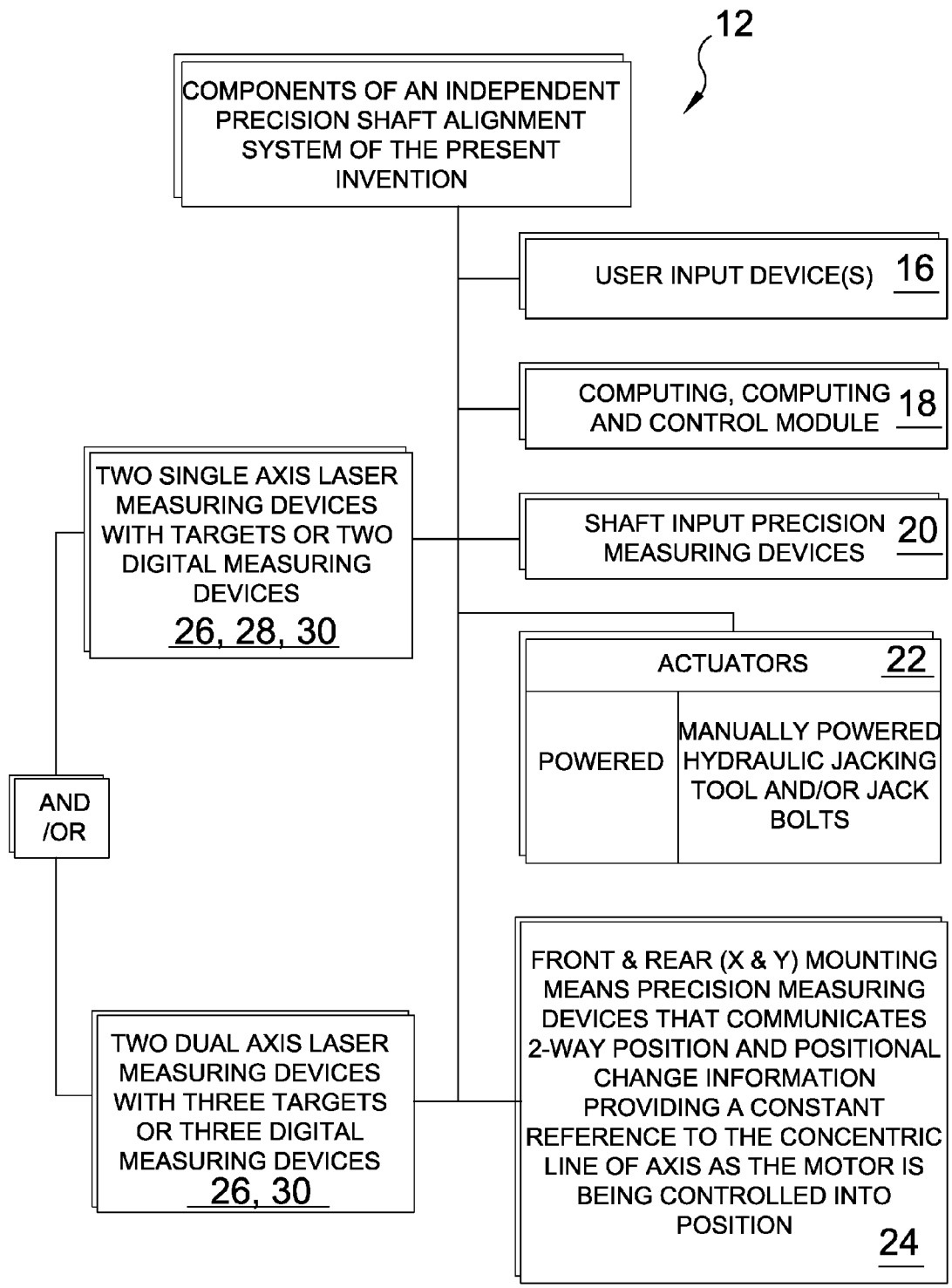
FIG. 2 is a block diagram of the precision shaft alignment system of the present invention's component modules.

FIG. 2 is a block diagram of the precision shaft alignment system of the present invention's component modules when utilized as a stand alone system 12, including a user input device 16 such as a touch screen monitor, key entry, or other, a computing and control module 18 that calculates and initiates the required positional travel, precision measuring devices two laser sources with two single or dual axis laser measuring sensors 28 or 30 or two digital measuring devices 26 that read and send the coordinates for the centerline of axis for each of the shafts and actuators 22 that provide means for the unit to be repositioned. Including front and rear (X & Y) precision measuring devices 24 (two laser sources with three dual axis laser measuring sensors 30 or three digital measuring devices 26) that communicate 2-way position and positional change information providing a constant reference to the concentric line of axis as the motor is being controlled into position by direct response to the controller.

Figure 3:
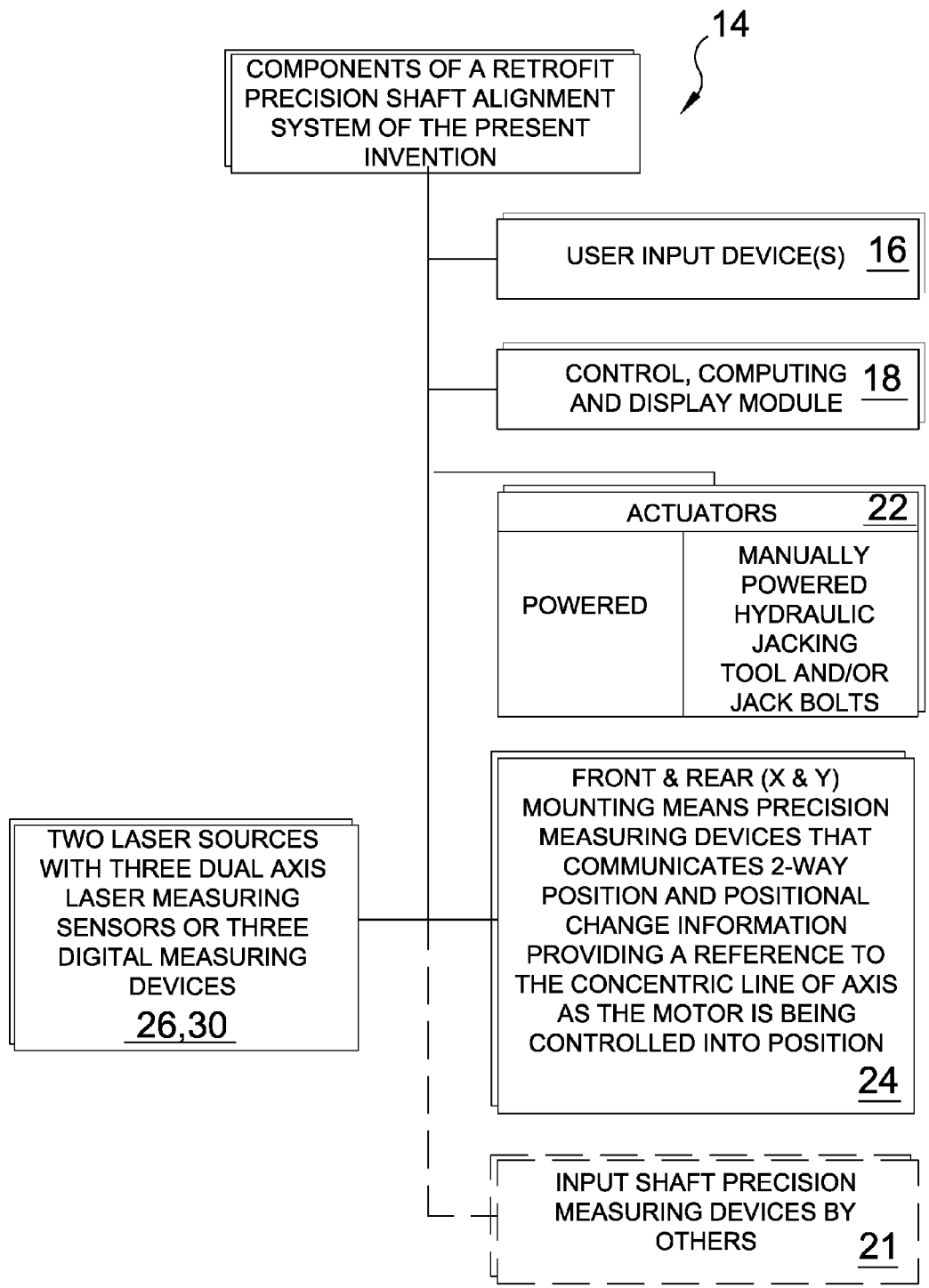
FIG. 3 is a block diagram of the precision shaft alignment system of the present invention's components.

FIG. 3 is a block diagram of the precision shaft alignment system of the present invention's component modules when utilized as a retrofit system 14 includes a user input device 16 such as a touch screen monitor, key entry, or other providing means to enter shaft coordinates from the existing measuring system 21, a computing, control and display module 18 that calculates and initiates and controls the required positional travel, and actuators 22 that provide means for the unit to be repositioned. Responding to the front and rear (X & Y) precision measuring modules 24 (two laser sources with three dual axis laser measuring sensors 30 or three digital measuring devices 26) for 2-way position and positional change information providing a reference to the concentric line of axis as the motor is being controlled into position.

Figure 4:
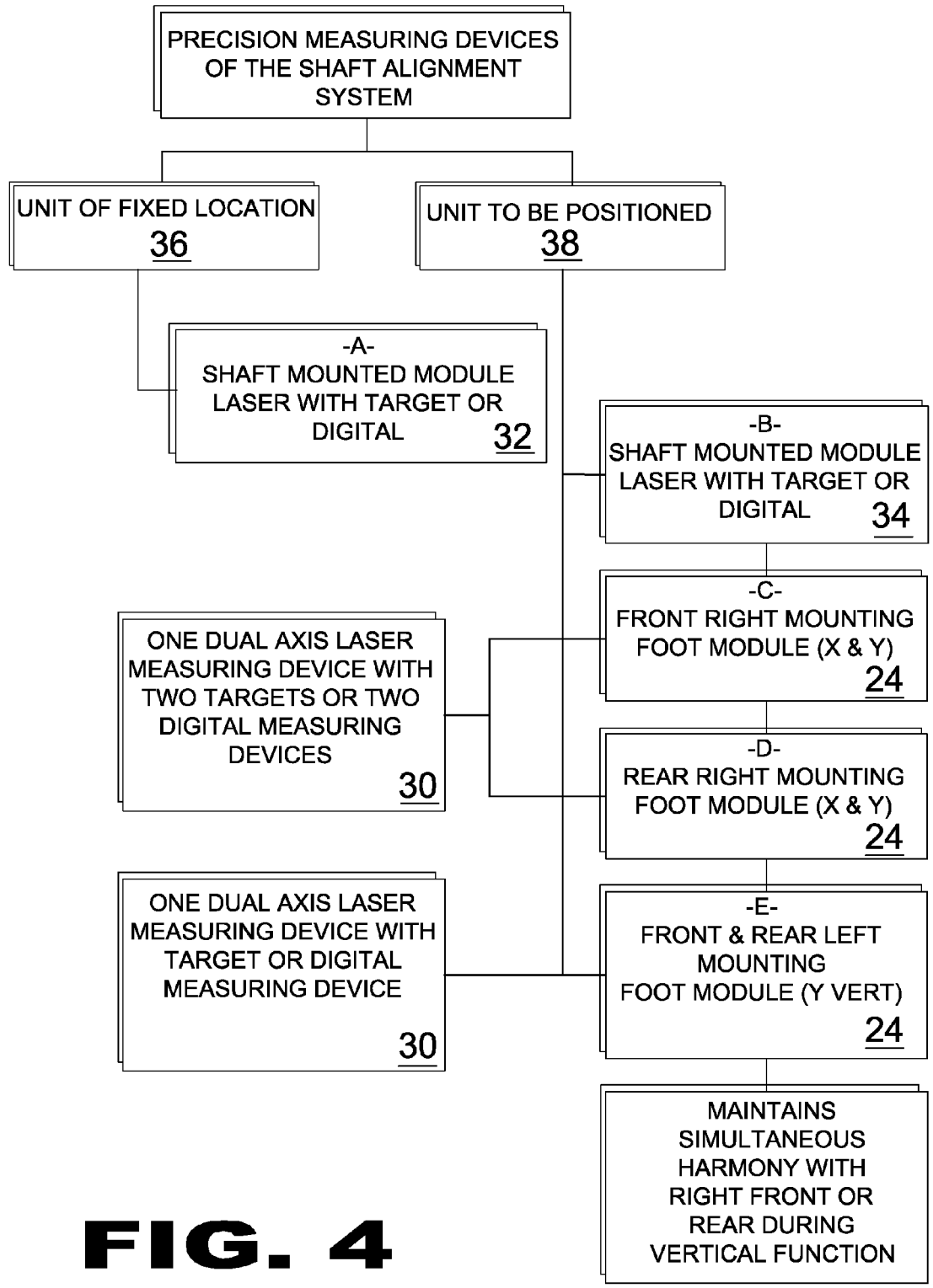
FIG. 4 is a block diagram of the precision measuring devices of the shaft alignment system of the present invention.

FIG. 4 is a block diagram of the precision measuring devices of the shaft alignment system of the present invention. A plurality of precision measuring modules are utilized to identify the x-y coordinates of both units. The fixed unit 36 is equipped with a precision measuring module 32 along the drive shaft. The unit to be positioned 38 is equipped with precision measuring modules 34 on the drive shaft. Two laser sources with three dual axis laser measuring sensors 30 or three digital measuring devices 26 are the mounting means precision measuring devices 24 that are integral with each mounting foot.

Figure 5:
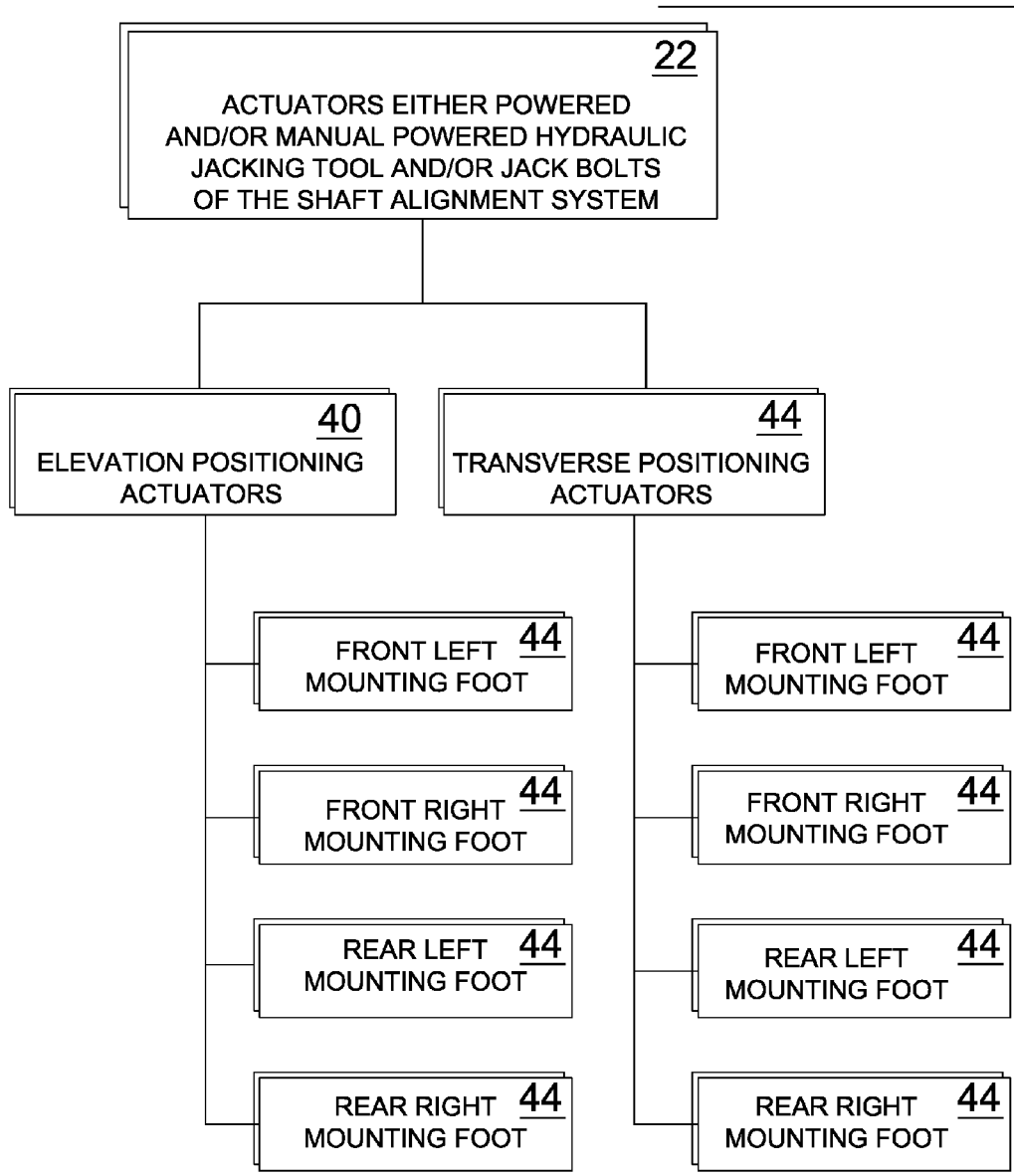
FIG. 5 is a block diagram of the powered actuator devices for the shaft alignment system of the present invention.

FIG. 5 is a block diagram of the actuator devices 22 for the shaft alignment system of the present invention. A plurality of actuators 22 are utilized to drive the unit to be positioned. Each of the mounting feet are equipped with elevation positioning actuators 40 as well as transverse positioning actuators 44 providing means for horizontal positioning.

Figure 6:
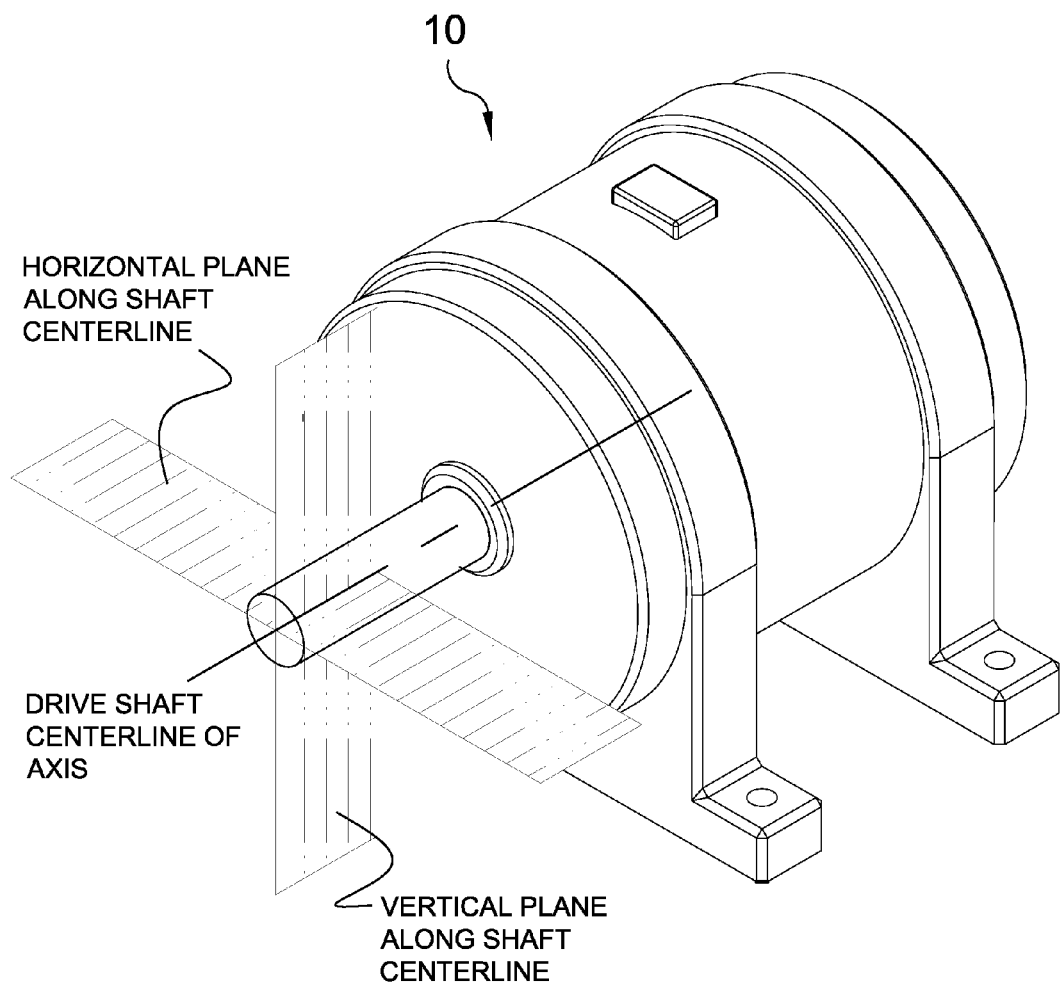
FIG. 6 is an illustrative view of the precision measuring devices of the shaft alignment system of the present invention.

FIG. 6 is an illustrative view of the precision measuring devices of the shaft alignment system of the present invention 10. By measuring the x-y coordinates along two points on the centerline of the drive shaft, the precision measuring modules create a precise identification of the travel requirements of the second drive shaft. These coordinates are signaled to or data entered into the computing and control module.

Figure 7:
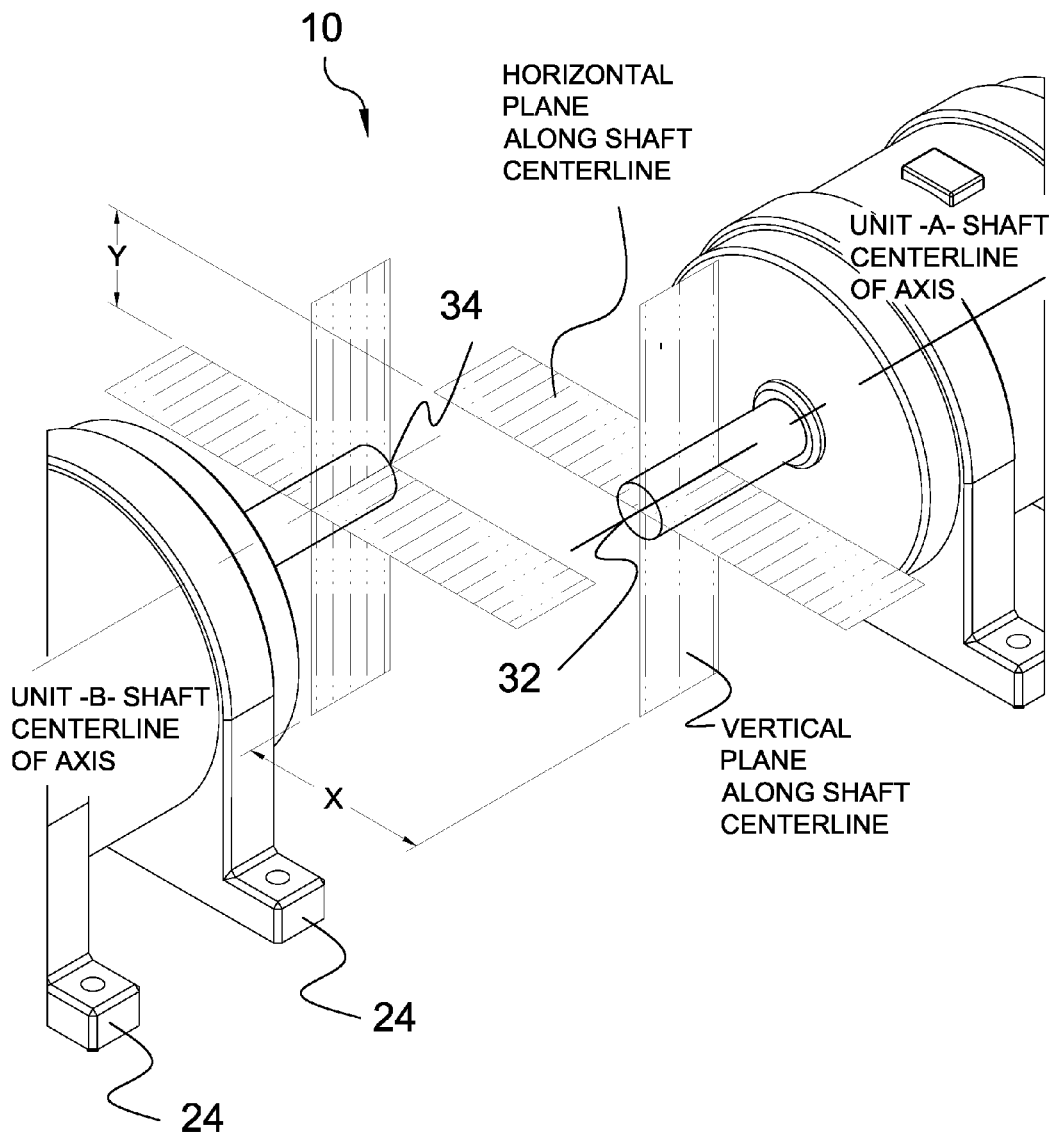
FIG. 7 is an illustrative view of the precision measuring devices of the shaft alignment system of the present invention.

FIG. 7 is an illustrative view of the precision measuring devices of the shaft alignment system of the present invention 10. The precision measuring modules 32,34 measure the x-y coordinates along two points on the centerline of both drive shafts 46,48. These coordinates are signaled to, or data entered into the computing and control module. The computing and control module calculates: the relationship of measuring modules 24 C and D (front and rear (X & Y) mounting means) in coordinance with the concentric line of axis of measuring devices 20 A and B (shaft input measuring devices).

Figure 8:
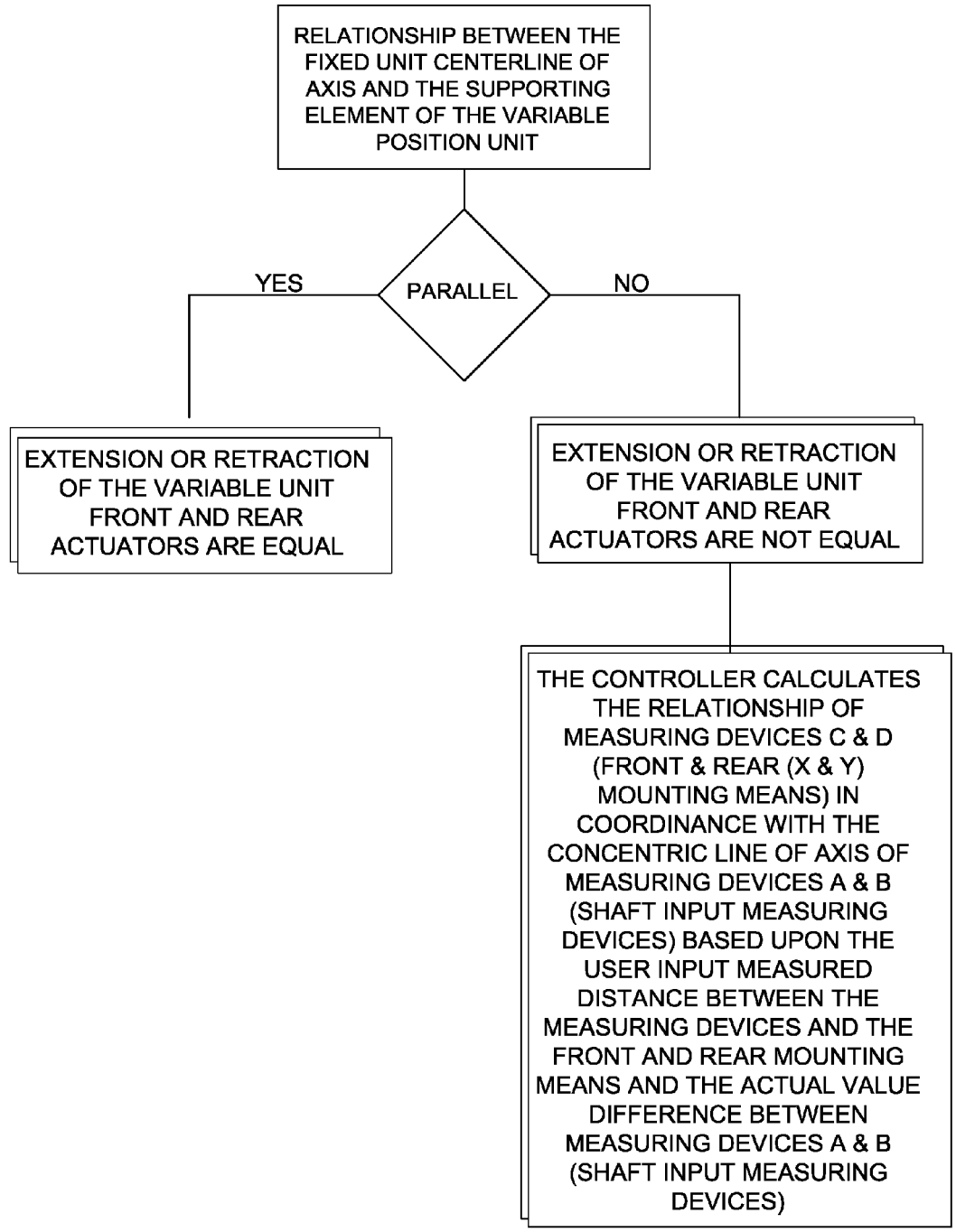
FIG. 8 is a diagram describing the travel requirements based on the defined X-Y coordinates of both shafts.

FIG. 8 is a diagram of the present invention 10 describing the travel requirements based on the defined X-Y coordinates of both shafts. If the drive shaft centerlines of the stationary unit and the reposition unit are parallel, the front and rear actuators affixed to the mounting feet of the reposition unit will extend or retract the same distance. If the drive shaft centerlines of the stationary unit and reposition unit are not parallel the rear actuators affixed to the mounting feet of the reposition unit will extend or retract until measuring devices C and D placed at the front and rear mounting means communicating the calculated concentric line of axis coordinates become equal to each other will then automatically stop.

Figure 9:
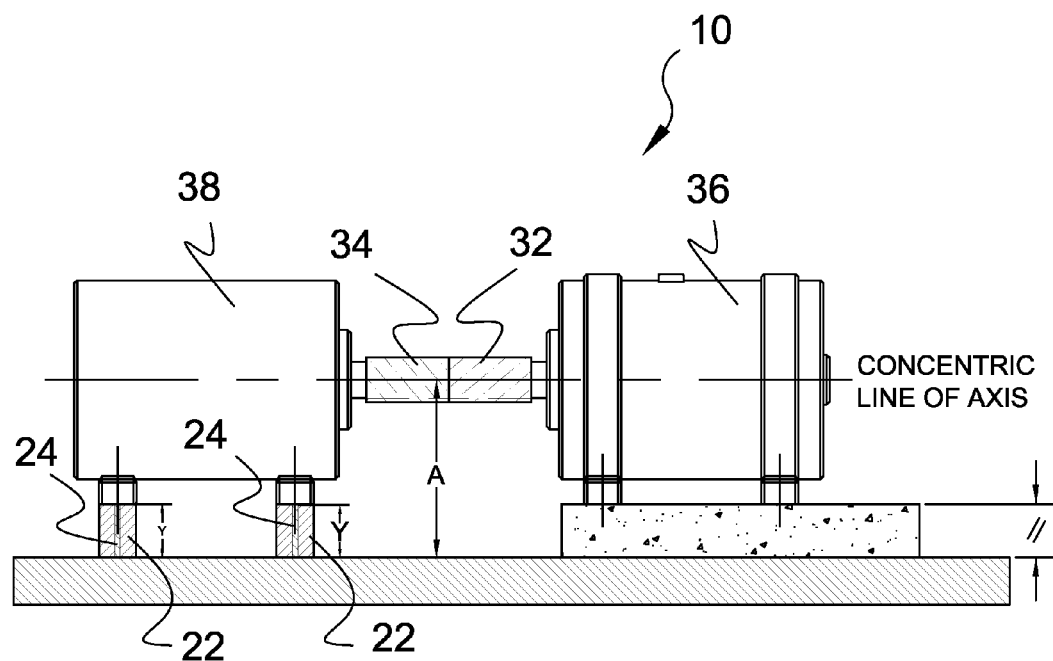
FIG. 9 is an illustrative view describing the travel requirements based on the defined X-Y coordinates of both shafts.

FIG. 9 is an illustrative view describing the travel requirements based on the defined X-Y coordinates of both shafts as determined by their respective measuring modules 32,34. Depicted is a condition wherein the drive shaft centerlines of the stationary unit 36 and the reposition unit 38 are parallel. The front and rear actuators 22 affixed to the mounting feet respond to their respective measuring modules 24 of the reposition unit and will travel the same distance "y" then automatically stop or when using a manually powered hydraulic jacking system or conventional tools such as jack bolts, pry bars etc. movement is controlled by monitoring a series of changing colored lights: Green, Yellow, Red.

Flashing Green Arrow Light—Identifies direction of movement travel.

Green Light—Identifies if the front or rear or both front and rear requires movement.

Yellow Light—Signals when you are within close positioning proximity.

Flashing Yellow Light—Signals when you are about to exceed parallel offset proximity in the horizontal parallel offset process in order to maintain equal movement of the front and rear.

Red Light—Signals when to stop movement.

The lights are displayed on the control display and computing module. In the vertical angular process of the manual movement the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

Figure 10:
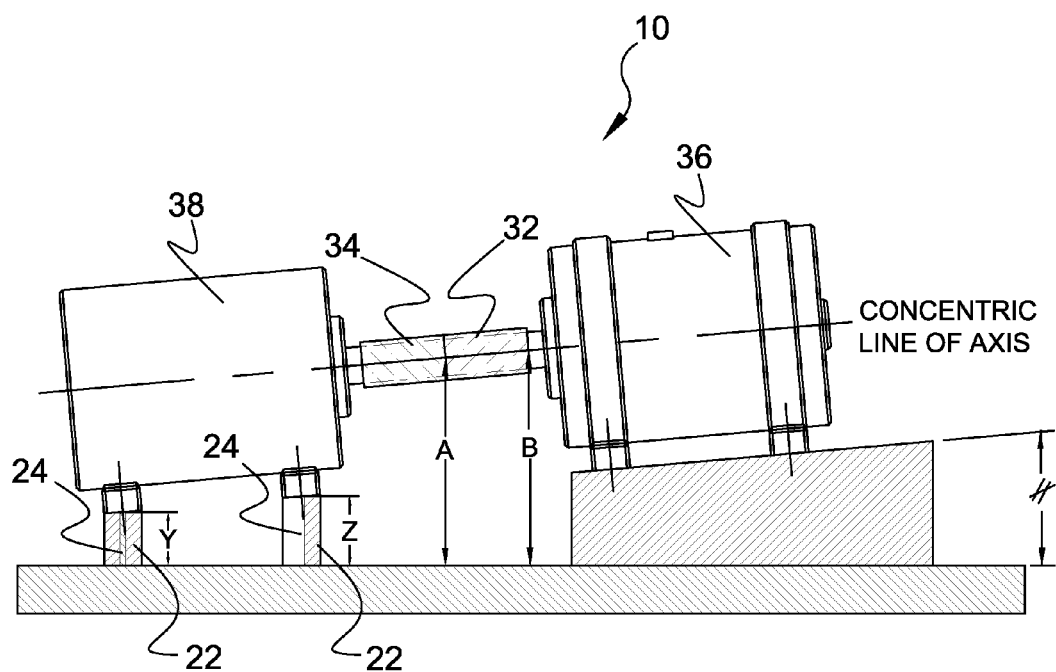
FIG. 10 is an illustrative view describing the travel requirements based on the defined X-Y coordinates of both shafts.

FIG. 10 is an illustrative view describing the travel requirements based on the defined x-y coordinates of both shafts as determined by their respective measuring modules 32,34. Depicted is a condition wherein the drive shaft centerlines of the stationary unit 36 and the reposition unit 38 are not parallel. To create a concentric line of axis, the front and rear actuators 22 affixed to the mounting feet of the reposition unit are moved at unlike distances according to their respective measuring modules 24.

Figure 11:
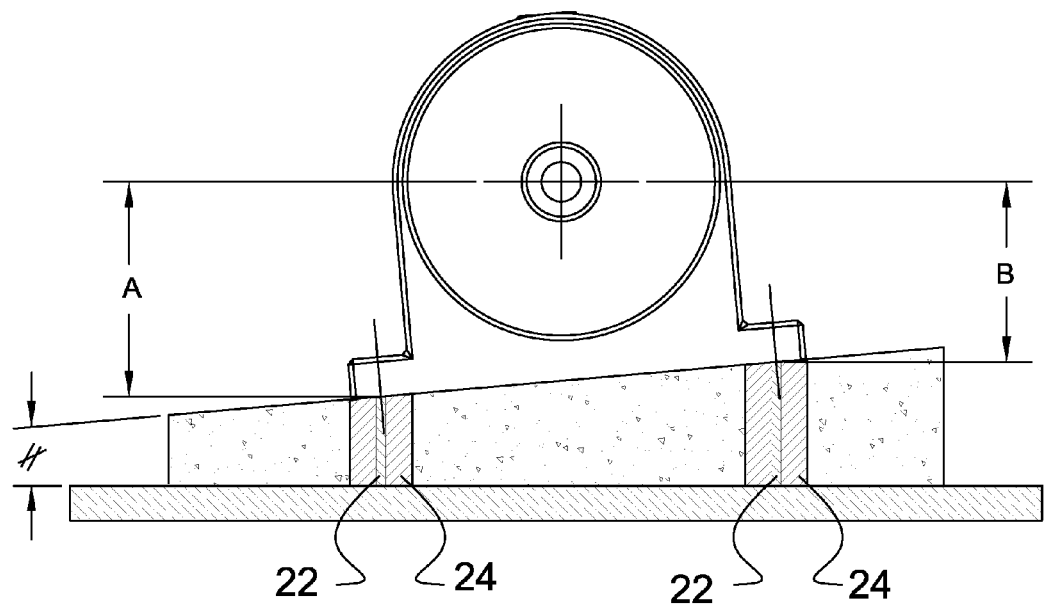
FIG. 11 is an illustrative view describing the travel requirements based on the defined X-Y coordinates of both shafts.

FIG. 11 is an illustrative view describing the travel requirements based on the defined x-y coordinates of both shafts. Depicted is a condition wherein the drive shaft centerlines of the stationary unit and the reposition unit are not parallel. To create a concentric line of axis, the front and rear actuators 22 affixed to the mounting feet of the reposition unit are moved at unlike distances in response to their respective measuring modules 24.

Figure 12:
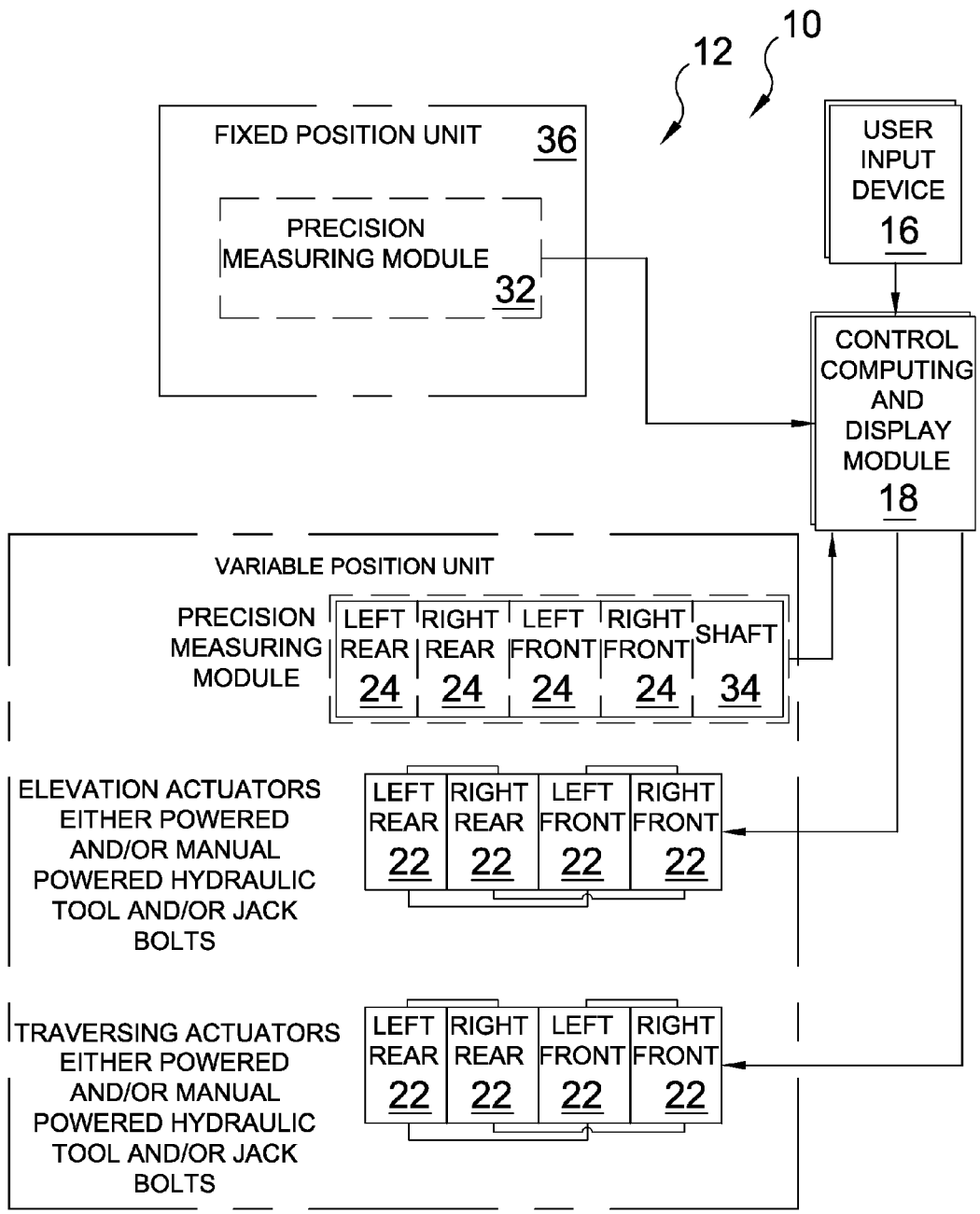
FIG. 12 is a diagram of the precision shaft alignment system of the present invention's component modules.

FIG. 12 is a diagram of the precision shaft alignment system of the present invention's 10 component modules of the fixed unit 36 and the variable position unit 38. When utilized as a stand alone system 12, the precision shaft alignment system of the present invention includes a user input device 16 such as a touch screen monitor, key entry, or other, a computing and control module 18 that calculates and initiates the required controlled positional travel, shaft-mounted precision measuring devices 32,34 that read and send the coordinates for the centerline of axis for each of the shafts and additional precision measuring modules 24 in communication with the actuators 22 that provide means for the unit to be repositioned. Front and rear (x&y) precision measuring modules 24 that communicate 2-way position and positional change information providing a constant reference to the concentric line of axis as the driver motor is being controlled into position.

Figure 13:
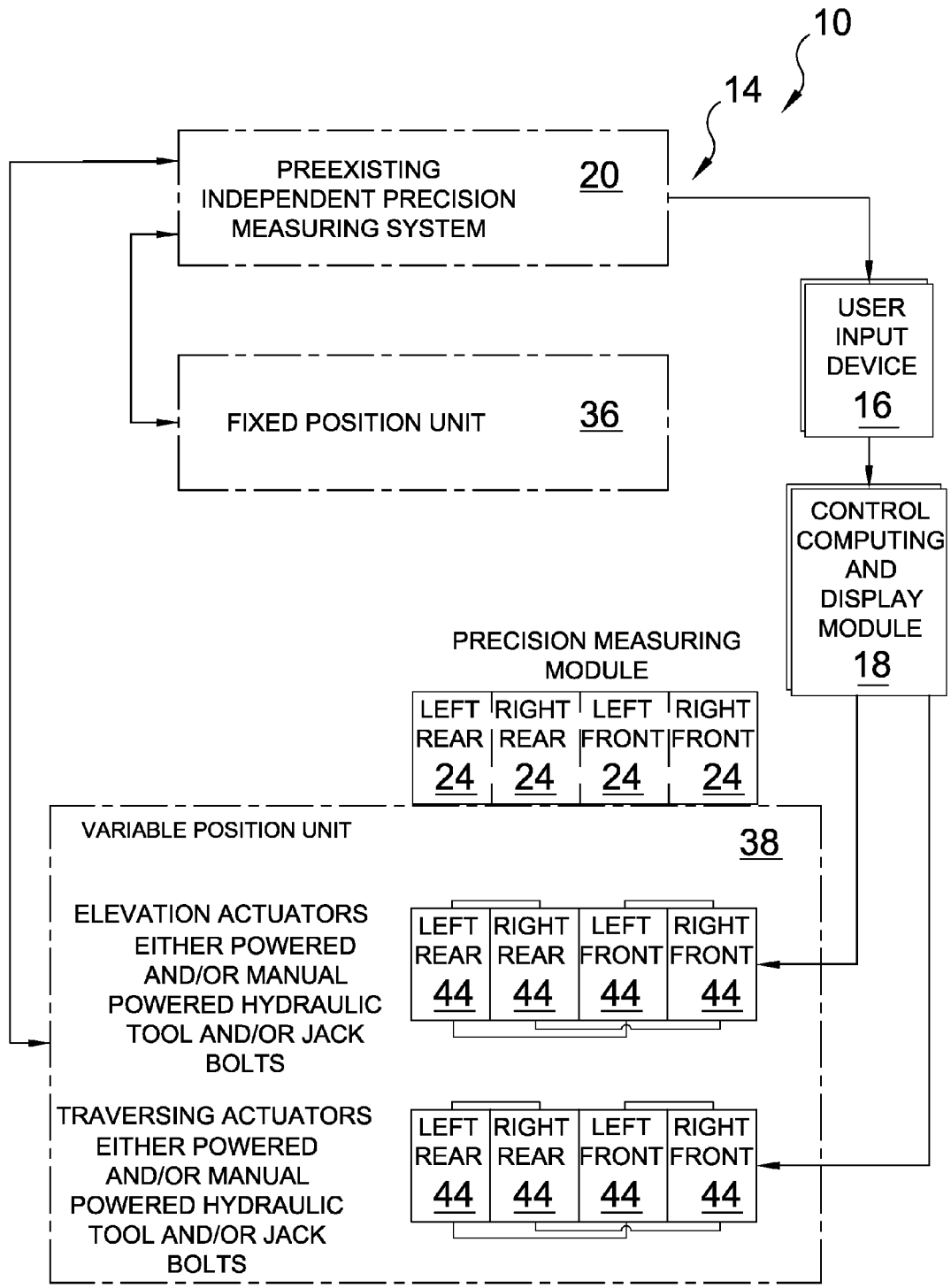
FIG. 13 is a block diagram of the precision shaft alignment system of the present invention's component modules.

FIG. 13 is a block diagram of the precision shaft alignment system of the present invention's 10 component modules. When utilized as a retrofit system 14 to align a fixed unit 36 and a variable position unit 38, the precision shaft alignment system of the present invention includes a user input device 16 such as a touch screen monitor, key entry, or other providing means to enter shaft coordinates from the existing measuring system, a computing, control and display module 18 that calculates and initiates the required controlled positional travel, and actuators 40,42 that provide means for the unit to be repositioned. Based upon information provided by the front and rear (X & Y) precision measuring modules 24 directly responding to the position and positional change information providing a constant reference to the concentric line of axis as the motor is controlled into position.

Figure 14:
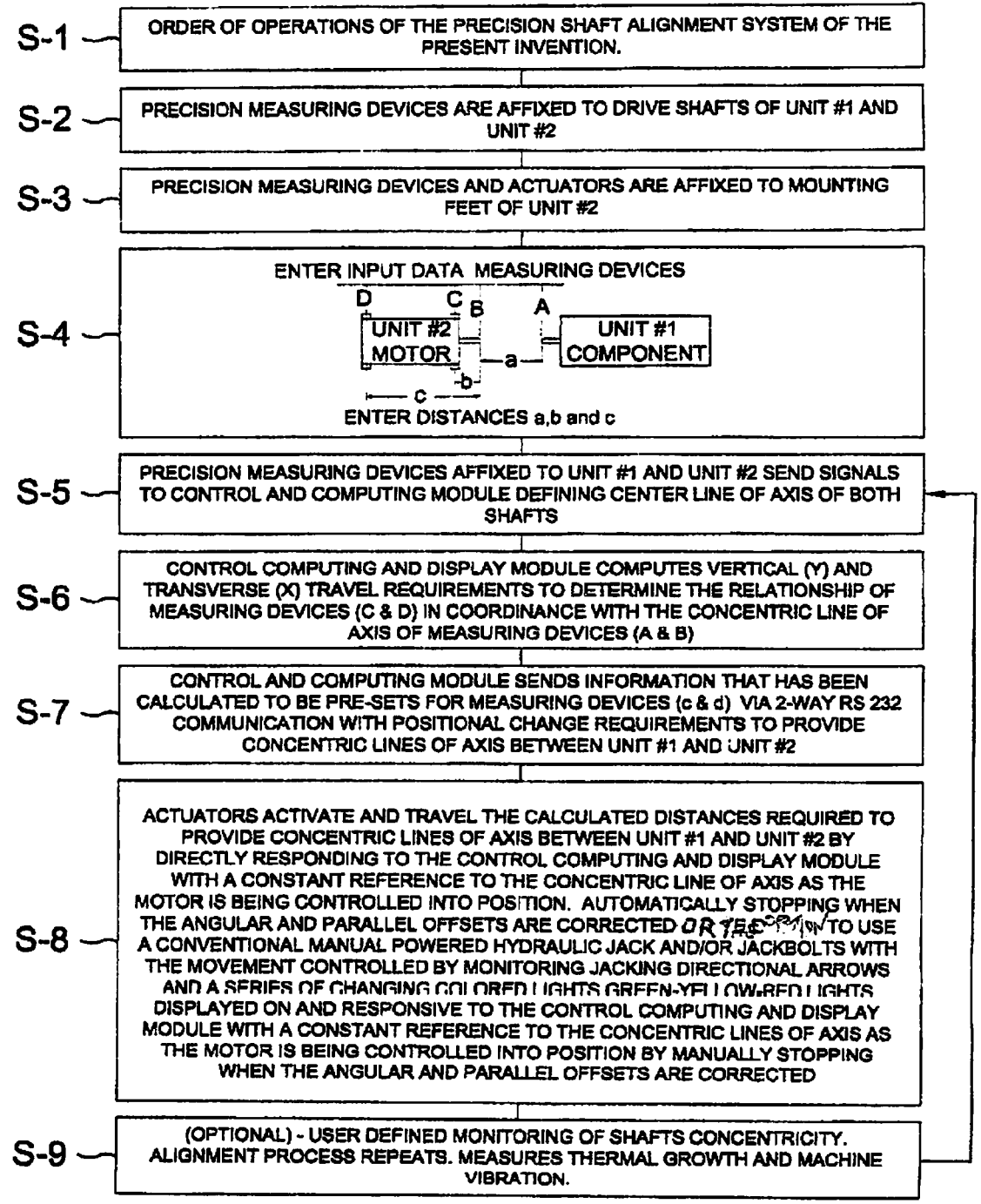
FIG. 14 is a diagram of the precision shaft alignment system of the present invention's order of operations.

FIG. 14 is a diagram of the precision shaft alignment system of the present invention's order of operations. Depicted is the present invention's order of operations when utilized as a stand-alone system. Step one is the order of operations of the precision shaft alignment system of the present invention. Step two involves affixing precision measuring devices to the drive shafts of unit #1 and unit #2. In step three the precision measuring devices and actuators are affixed to the mounting feet of unit #2. Enter input data for distances a, b and c in step four. In step five the precision measuring devices affixed to unit #1 and unit #2 send signals to control and computing module defining the center line axis of both shafts. Taking place in step six the control computing and display module computes vertical and transverse travel requirements to determine the relationship of measuring devices C and D in accordance with the concentric line of axis of measuring devices A and B. Advancing to step seven, the control and computing module sends information that has been calculated to be pre-sets for measuring devices (C and D) via 2-way RS232 communication with positional change requirements to provide concentric lines of axis between unit #1 and unit #2. Proceeding to step eight, the actuators activate and travel the calculated distances required to provide concentric lines of axis between unit #1 and unit #2 by directly responding to the control display and computing module with a constant reference to concentric line of axis as the motor is being controlled into position. Automatically stopping when the angular and parallel offsets are corrected or the option to use a conventional manual powered hydraulic or tools such as jack bolts, pry bars, etc. with the movement controlled by monitoring a series of changing colored lights: Green-Yellow-Red.

Flashing Green Arrow Light—Identifies direction of movement travel.

Green Light—Identifies if the front or rear or both front and rear requires movement.

Yellow Light—Signals when you are within close positioning proximity.

Flashing Yellow Light—Signals when you are about to exceed parallel offset proximity in the horizontal parallel offset process in order to maintain equal movement of the front and rear.

Red Light—Signals when to stop movement.

These lights are displayed on and responsive to the control computing and display module with a constant reference to the concentric line of axis as the motor is being controlled into position based upon 2-way RS 232 position and positional change information being communicated by the front and rear (X&Y) measuring modules by manually stopping when the angular and parallel offsets are corrected. In the vertical angular process of the manual movement the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

An optional step nine includes the user defined monitoring of shafts concentricity. The alignment process repeats thereby accounting for and compensating for thermal growth, soft foot and machine vibration.

Figure 15:
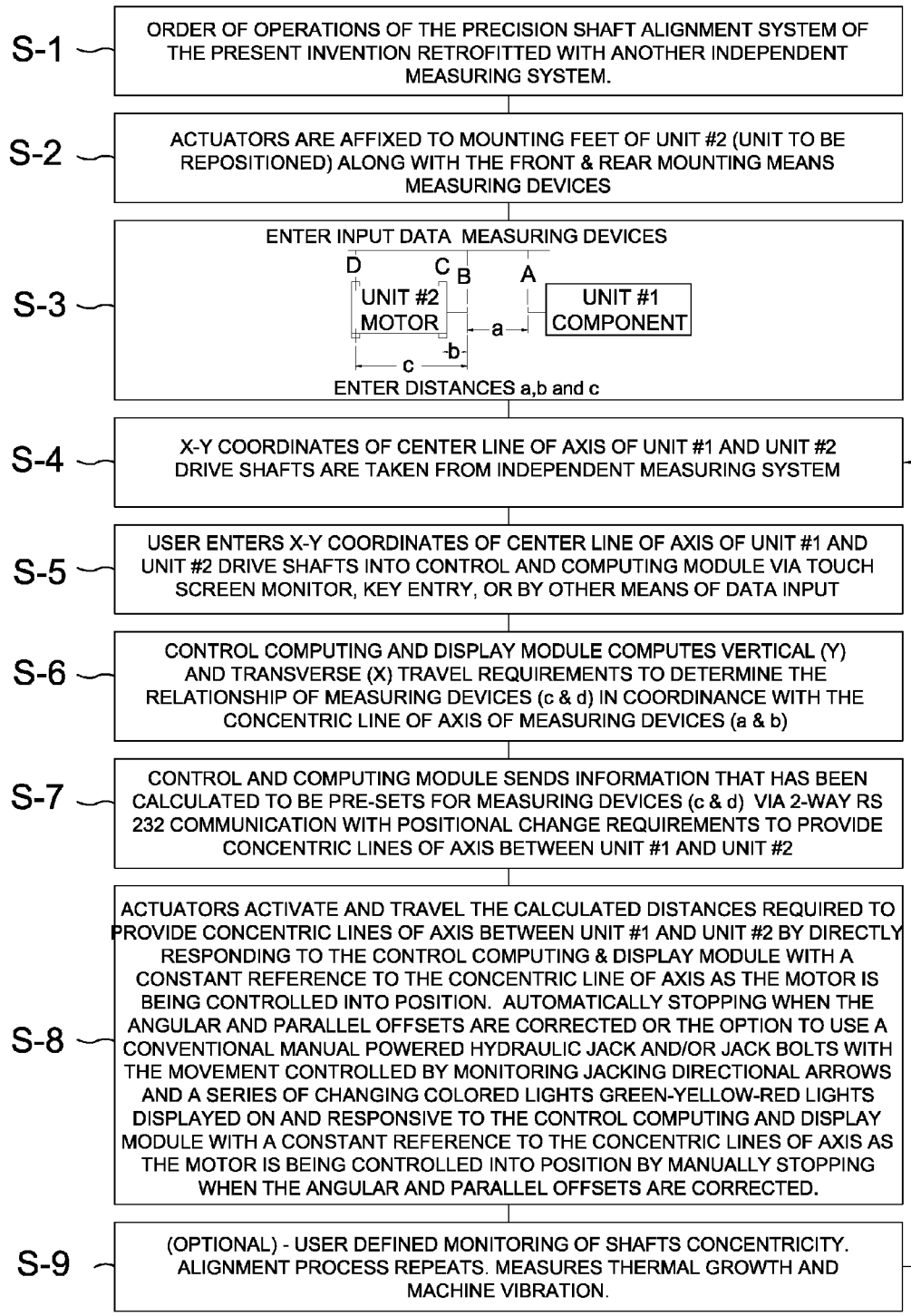
FIG. 15 is a diagram of the precision shaft alignment system of the present invention's order of operations.

FIG. 15 is a diagram of the precision shaft alignment system of the present invention's order of operations. Depicted is the present invention's order of operations when utilized as a retrofit system. Step one is the order of operations of the precision shaft alignment system of the present invention retrofitted with another independent measuring system. The actuators are affixed to the mounting feet of the unit to be positioned along with front and rear mounting means measuring devices C and D in step two and step three includes entering input data for distances a, b and c. Step four involves taking the x-y coordinates of the center line axis of the shafts of said fixed unit and said variable position unit from said independent measuring system. Step five has the user inputting said x-y coordinates of the center lines of the shafts of said fixed unit and said variable position unit into said control and computing module via touch screen monitor via said user input device. Step six includes said control and computing module calculating vertical (y) and transverse (x) travel requirements to determine the relationship of measuring devices C and D in coordinance with the concentric line of axis of the respective measuring devices A and B locating the shafts of said fixed unit and said variable position unit. In step seven, the control and computing module sends information that has been calculated to be pre-sets for said mounting means measuring devices C and D via 2-way RS 232 communication with position and positional change requirements to provide concentric lines of axis between said shafts of said fixed unit and said variable position unit. Activating said actuators and traveling the calculated distances required to provide concentric lines of axis between the shafts of said fixed unit and said variable position unit by directly responding to said control and computing module with a constant reference to the concentric lines of axis as the motor is being controlled into position and automatically stopping when the angular and parallel offsets are corrected or the option to use a conventional manual powered hydraulic jack and/or jack bolts, pry bars etc. with the movement controlled by monitoring a series of changing colored lights: Green-Yellow-Red.

Flashing Green Arrow Light—Identifies direction of movement travel.

Green Light—Identifies if the front or rear or both front and rear requires movement.

Yellow Light—Signals when you are within close positioning proximity.

Flashing Yellow Light—Signals when you are about to exceed parallel offset proximity in the horizontal parallel offset process in order to maintain equal movement of the front and rear.

Red Light—Signals when to stop movement.

These lights are displayed on and responsive to the control computing and display module with a constant reference to the concentric line of axis as the motor is being controlled into position based upon 2-way RS 232 position and positional change information being communicated by the front and rear (X&Y) measuring modules by manually stopping when the angular and parallel offsets are corrected. In the vertical angular process of the manual movement the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A precision shaft alignment system used in powered and/or hydraulic power tools for establishing concentric axial alignment of a first rotatably mounted shaft extending from a fixed unit with a second opposed, rotatably mounted shaft extending towards said first shaft from a variable position unit being positioned for use therewith, said precision alignment system comprising:
   a) a control and computing module;
   b) an input measuring means to provide precise x,y coordinates of the concentric line of axis of said variable shaft and said fixed shaft, said input measuring means in communication with said control and computing module;
   c) a plurality of variable position unit mounting means precision measuring modules in communication with said control and computing module to receive and transmit x/y repositioning data therefrom required to align said shafts; and d) a plurality of actuators wherein said actuators are taken from the group of powered actuators, manually powered hydraulic jacking tools, conventional tools, jack bolts and pry bars; and
e) wherein manually powered tools include hydraulic jacking tools, conventional tools, jack bolts and pry bars that are used in conjunction with a plurality of lights wherein a Flashing Green Arrow Light identifies direction of movement travel; a Green Light identifies if the front or rear or both front and rear requires movement; a Yellow Light signals when you are within close positioning proximity; a Flashing Yellow Light signals when you are about to exceed parallel offset proximity in the horizontal parallel offset process to maintain equal movement of the front and rear; and a Red Light signals when to stop movement, which are incorporated in said control and computing module with a constant reference to the concentric line of axis of the motor shaft as the motor is being controlled into position based upon position and positional change information being communicated via 2-way RS232 by the front and rear X&Y measuring modules so that in the vertical angular process of the manual movement, the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

2. A precision shaft alignment system used in powered and/or hydraulic power tools for establishing concentric axial alignment of a first rotatably mounted shaft extending from a fixed unit with a second opposed, rotatably mounted shaft extending towards said first shaft from a variable position unit being positioned for use therewith, said precision alignment system comprising:
a) a control and computing module;
b) an input measuring means to provide precise x,y coordinates of the concentric line of axis of said variable shaft and said fixed shaft, said input measuring means in communication with said control and computing module;
c) a plurality of variable position unit mounting means precision measuring modules in communication with said control and computing module to receive and transmit x/y repositioning data therefrom required to align said shafts; and
d) a plurality of actuators wherein said actuators are taken from the group of powered actuators, manually powered hydraulic jacking tools, conventional tools, jack bolts and pry bars; and
e) wherein movement of said plurality of manually powered hydraulic jacking tools and jacking bolts is controlled by monitoring said control and computing plurality of lights wherein a Flashing Green Arrow Light identifies direction of movement travel; a Green Light identifies if the front or rear or both front and rear requires movement; a Yellow Light signals when you are within close positioning proximity; a Flashing Yellow Light signals when you are about to exceed parallel offset proximity in the horizontal parallel offset process in order to maintain equal movement of the front and rear; and a Red Light signals when to stop movement, which are incorporated in said control and computing module with a constant reference to the concentric line of axis of the motor shaft as the motor is being controlled into position based upon position and positional change information being communicated via 2-way RS232 by the front and rear X&Y measuring modules so that in the vertical angular process of the manual movement, the control and computing module determines the amount of shims needed to correct the angular by a comparison of the original predetermined concentric line of axis rear presets stored in memory before movement begins to the actual distance the rear has traveled by directly responding when the sum of rear measuring devices D+D1 divided by 2=measuring device C.

* * * * *